United States Patent [19]
Brownlee et al.

[11] Patent Number: 5,642,480
[45] Date of Patent: Jun. 24, 1997

[54] METHOD AND APPARATUS FOR ENHANCED SECURITY OF A DATA PROCESSOR

[75] Inventors: Paul M. Brownlee, Gilbert; Jeffery E. Bills, Chandler, both of Ariz.

[73] Assignee: Motorola, Inc., Schaumburg, Ill.

[21] Appl. No.: 535,683

[22] Filed: Sep. 28, 1995

[51] Int. Cl.$^6$ .................................................. G06F 11/00
[52] U.S. Cl. .................... 395/186; 395/490; 395/726; 365/189.09; 365/195; 365/201
[58] Field of Search .................... 395/186, 182.2, 395/182.08, 182.03, 472, 479, 490, 491; 371/40.1, 21.1; 365/189.01, 185.22, 189.05; 380/3, 4, 23, 25

[56] References Cited

U.S. PATENT DOCUMENTS

| | | | |
|---|---|---|---|
| 4,590,552 | 5/1986 | Guttag et al. | 364/200 |
| 4,713,792 | 12/1987 | Hartmann et al. | 364/900 |
| 4,908,796 | 3/1990 | Lee et al. | 365/189.05 |
| 4,974,208 | 11/1990 | Nakamura et al. | 365/228 |
| 5,014,191 | 5/1991 | Padgaonkar et al. | 364/200 |
| 5,057,999 | 10/1991 | Kase et al. | 364/200 |
| 5,067,077 | 11/1991 | Wakimoto et al. | 395/400 |
| 5,134,700 | 7/1992 | Eyer et al. | 395/425 |
| 5,175,840 | 12/1992 | Sawase et al. | 395/425 |
| 5,251,304 | 10/1993 | Sibigtroth et al. | 395/375 |
| 5,274,778 | 12/1993 | Hall | 395/425 |
| 5,293,610 | 3/1994 | Schwarz | 395/425 |
| 5,432,950 | 7/1995 | Sibigtroth | 395/425 |
| 5,446,864 | 8/1995 | Burghardt et al. | 395/427 |
| 5,465,341 | 11/1995 | Doi et al. | 395/183.06 |

*Primary Examiner*—Robert W. Beausoliel, Jr.
*Assistant Examiner*—Dieu-Minh Le
*Attorney, Agent, or Firm*—J. Gustav Larson

[57] ABSTRACT

A security system for a data processor. The data processor includes a register storage area (14) and a main memory storage area (16). The register storage area (14) and the main memory storage areas (16) are defined to assure that as a voltage is varied, that the integrity of the register storage area (14) is guaranteed longer than the integrity of the main memory storage area (16).

17 Claims, 5 Drawing Sheets

METHOD AND APPARATUS FOR ENHANCED SECURITY OF A DATA PROCESSOR

CROSS REFERENCE TO RELATED, COPENDING APPLICATIONS

Related subject matter is contained in the following applications:

"Pseudo Static Mask Option Register and Method Therefor" by Gregory A. Racino and Jeffrey R. Jorvig, Ser. No. 08/194,900, filed Feb. 14, 1994, and assigned the assignee hereof; and "Data Processor Having Operating Modes Selected by at Least One Mask Option Bit and Method Therefor" By Michael Chatherwood and George L. Espinor, Ser. No. 08/323,558, filed Oct. 11, 1994 and assigned to the assignee hereof.

FIELD OF THE INVENTION

This invention relates generally to data processors, and more particularly to a data processor with a secured memory option.

BACKGROUND OF THE INVENTION

Data processors are classically defined as having a central processing unit, memory, and input/output devices. Recent advances in integrated circuit technology have allowed many of the classical computer functions to be integrated onto a single integrated circuit chip. These devices are known by a variety of terms such as microcontrollers, embedded controllers, microcomputers and the like. However, they share a common characteristic in that they have incorporated most classical computer functions on-chip. Because of their high level of integration, microcontrollers are ideal for use in products such as engine controllers, appliances, communications devices, and the like. In order to alleviate the need for external memory to store the operating program, microcontrollers commonly include non-volatile memory in the form of read only memory (ROM), programmable ROM (PROM), erasable programmable ROM (EPROM), electrically erasable programmable ROM (EEPROM OR E$^2$PROM), or one-time programmable ROM (OTPROM).

Microcontrollers continue to become more complex, and are capable of supporting large amounts of onboard non-volatile memory. As a result of the increased complexity and memory sizes, the cost of developing application software for microcontrollers has become a major investment. Often the success or failure of a product can depend on the ability to prevent others from obtaining copies of a product's microcontroller code.

It is well known that code stored in a microcontroller's non-volatile memory can be copied by configuring the microcontroller such that it will power-up in an external mode of operation. In this mode, the microcontroller will operate from code stored in an external memory location. An unauthorized individual may obtain a copy of application software stored in internal memory by placing code in the external memory that will read the contents of the internal memory, and write those contents to an output port. A microcontroller which supports a secured mode of operation can be used to prevent this unauthorized access from occurring.

As discussed in copending patent application Ser. No. 08/323,558, entitled "Data Processor Having Operating Modes Selected by at Least One Mask Option Bit and Method Therefor", a microcontroller may operate in a security mode through the use of a non-volatile register location. A specific bit of this register is dedicated to being a security bit. When the security bit is set, the microcontroller is in a secured mode of operation. A user can write to this register bit, in order to set the microcontroller into security mode.

Figure 1:
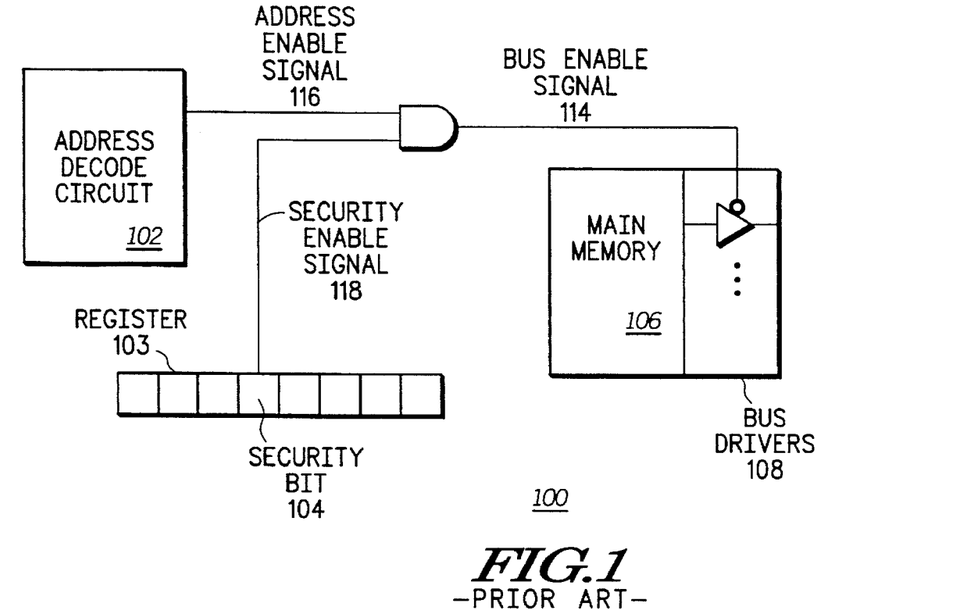
FIG. 1 illustrates, in block form, a security system for a data processor.

A prior art security mode circuit 100 is shown in the block diagram of FIG. 1. An address decode circuit 102 generates an address enable signal 116 when an internal memory location is being accessed. This signal is gated with a security enable signal 118, which is active when the security bit is set, to produce a bus enable signal 114. The bus enable signal is used to disable the drivers 108. Disabling the drivers prevents the contents of the main memory 106, where the code is stored, from being displayed external to the microcontroller. If the security bit 104 is enabled, and an access to the main memory 106 occurs, the bus drivers 108 will be disabled to prevent memory contents from being driven external to the microcontroller.

It is known that erroneous results may by obtained from an EPROM memory if the supply voltage is varied significantly. This would not present a security problem to a microcontroller's security mode if the voltage variation causing the security feature to fail also caused the on-chip memory to fail as well. However, a problem exists when registers and main memory locations consist of separate memory cells and sense-amps, and the supply voltage is varied. In such cases, it is possible for the register memory location to fail before the main memory, which contains the code, fails. When this happens, it is possible for the code to be copied in the manner previously described. Therefore, a need exists for an apparatus and method to prevent a register memory location containing a security bit from failing before the main memory location fails.

DETAILED DESCRIPTION OF A PREFERRED EMBODIMENT

Figure 2:
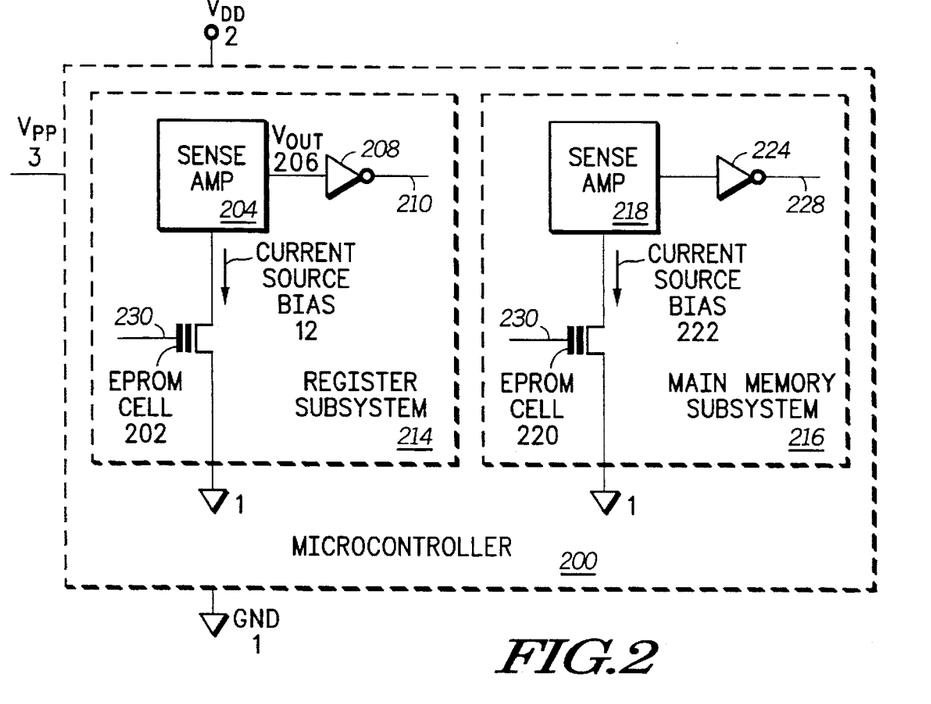
FIG. 2 illustrates, in block form, a register subsystem and a main memory subsystem of a microcontroller.

FIG. 2 shows a combination block and logic diagram of a memory subsystem 216, and a register subsystem 214, implemented in a single-chip microcontroller 200. The register subsystem comprises an EPROM cell 202, a sense amp 204, and a buffer 208 for generating a register data signal 210.

During normal operation, the source of the EPROM cell 202 is connected to GND, its drain is connected to the sense amp 204, and its gate is driven by a gate reference voltage 230 which can be equal to VDD. The sense amp 204 is connected to the input of buffer 208. Buffer 208 may be inverting or non-inverting. In the preferred embodiment, the buffer 208 is inverting as will be discussed below. The output, register data signal 210 of the buffer 208 represents a level shifted logic bit of a bit of data from a register, also referred to as register data.

During a programming operation, the drain and gate of the EPROM cell is driven to a programming voltage roughly three times Vdd. By doing so, the EPROM cell is modified such that its characteristic curve is changed. This EPROM characteristic curve represents the EPROM cell current versus gate to source voltage (Vgs). This shift in the characteristic curve due to programming is known as threshold voltage (Vt) shift.

Figure 3:
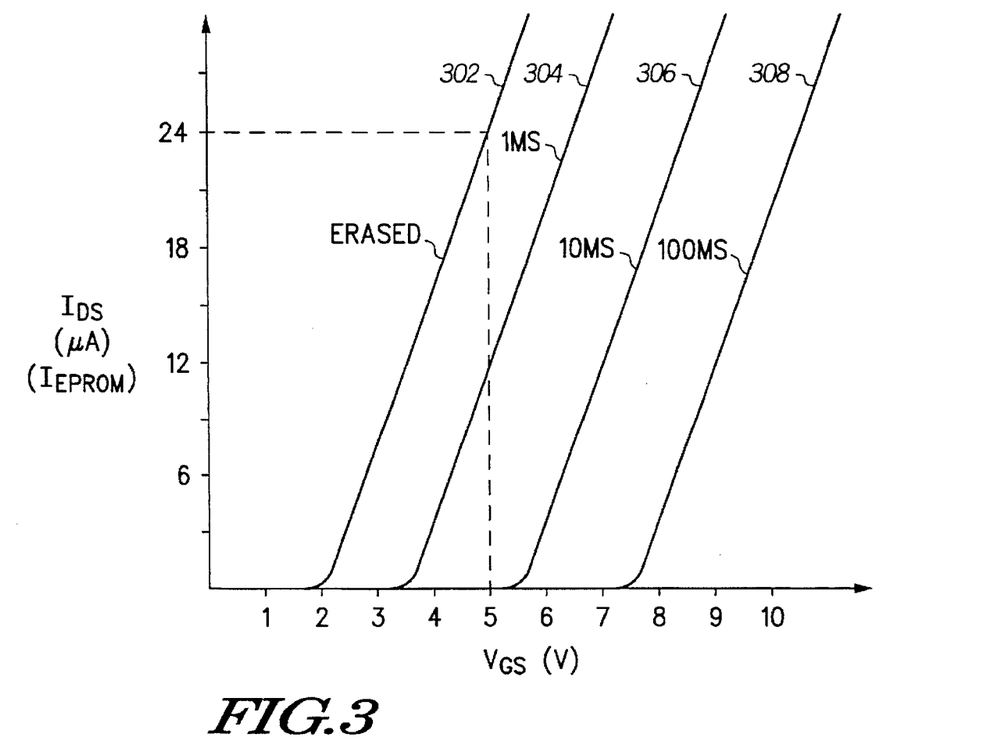
FIG. 3 illustrate, in graphical form, a set of characteristic curves for an EPROM cell.

FIG. 3 shows a possible set of characteristic curves for an EPROM cell. Each EPROM cell has a set of characteristic curves. How an EPROM cell is programmed, and its operating conditions, will determine which one of the set of curves it is operating on. When erased, the EPROM characteristic curve is represented by an erased EPROM characteristic curve 302. It is well known that by applying a programming voltage to the gate and drain of an EPROM cell for significant periods of time (greater that 1 ms), the EPROM characteristic curve will shift. This is the Vt previously mentioned and represents the fact that the longer an EPROM cell is programmed during the programming operation, the greater the gate voltage needed during normal operation to drive a predetermined current through the EPROM cell. The Vt shift in a programmed EPROM cell is apparent by comparing the location of the erased EPROM characteristic curve 302, to the programmed EPROM curves 304, 306, and 308. For a given memory cell, these curves represent a set of memory characteristic curves, or a set of EPROM characteristic curves for an EPROM memory cell. While a specific EPROM cell can be represented by a set of EPROM characteristic curves, the cell will operate on a specific EPROM characteristic curve in accordance with its programming. The point on a specific EPROM characteristic curve, at which a cell operates is determined by its gate to source voltage (Vgs).

During a read operation a voltage is applied to the EPROM cell gate while the source is grounded. This configuration allows the EPROM cell to conduct a current (Ieprom) which is a bias current that is sensed by circuitry described below. As discussed, FIG. 3 represents a possible set of EPROM characteristic curves for an EPROM cell. For a given voltage, the amount of current which will flow through the EPROM cell can be determined. For example, as shown in FIG. 3, drawing a vertical line from five volts Vgs will intersect the erased EPROM characteristic curve 302 at 24 uA and the sufficiently programmed curves 306 and 308 at a near zero value of approximately 1 nanoAmp.

Figure 4:
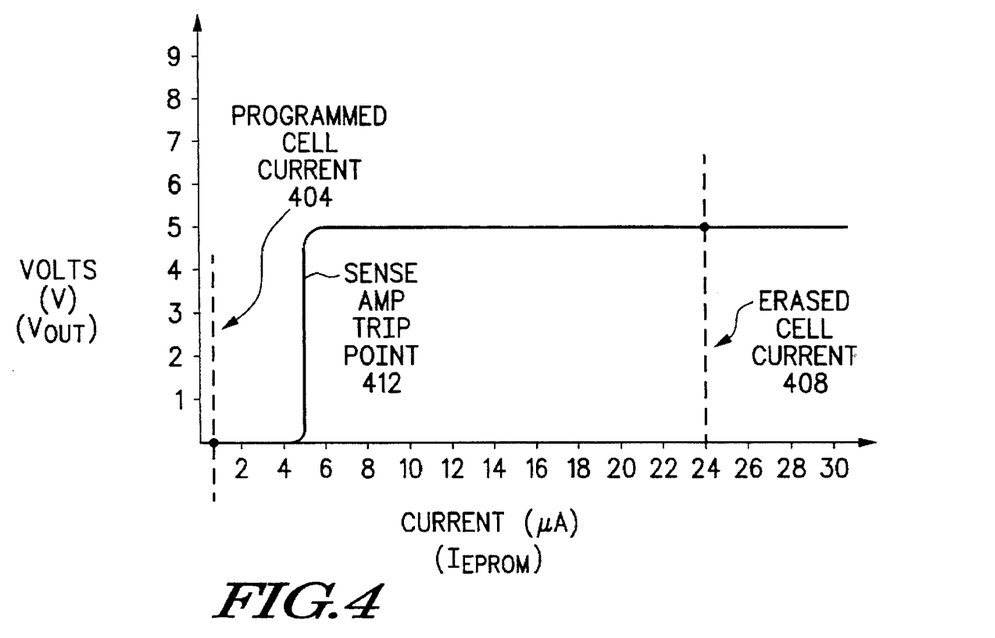
FIG. 4 illustrates, in graphical form, a sense amp transfer characteristic curve.

Referring again to FIG. 2, a sense amp 204 is used to determine whether the data stored in a given EPROM cell 202 represents a logic one or a logic zero. This is accomplished by detecting whether a given EPROM cell 202 or 220 is in an erased state, or has been programmed. The sense amp has its own characteristic curve, referred to as a sense amp characteristic curve, and is depicted in FIG. 4. The y axis, labeled Vout, is the sense amp output, which is representative of a data signal as would be present on node 210 or 228 of FIG. 2. The x axis depicts the current that the sense amp is sensing. As this current increases, there is a trip point 412 at which the output switches from one logic state to another.

By connecting an EPROM cell to the sensing node of the sense amp, and biasing its gate, in a manner previously discussed, the sense amp can sense whether an EPROM cell is erased or programmed. The sense amp characteristic curve's x-axis is now represented by the current Ieprom. FIG. 4, therefore, is the voltage versus current graph of the sense amp connected to an EPROM cell is referred to as a transfer characteristic curve.

Figure 5:
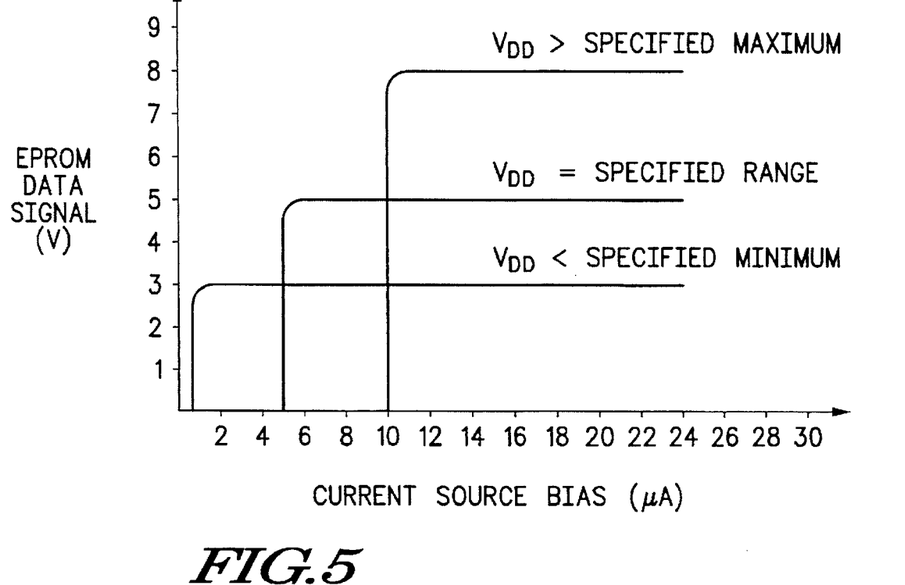
FIG. 5 illustrates, in graphical form, sense amp transfer characteristic curves at different voltage ranges.
Figure 6:
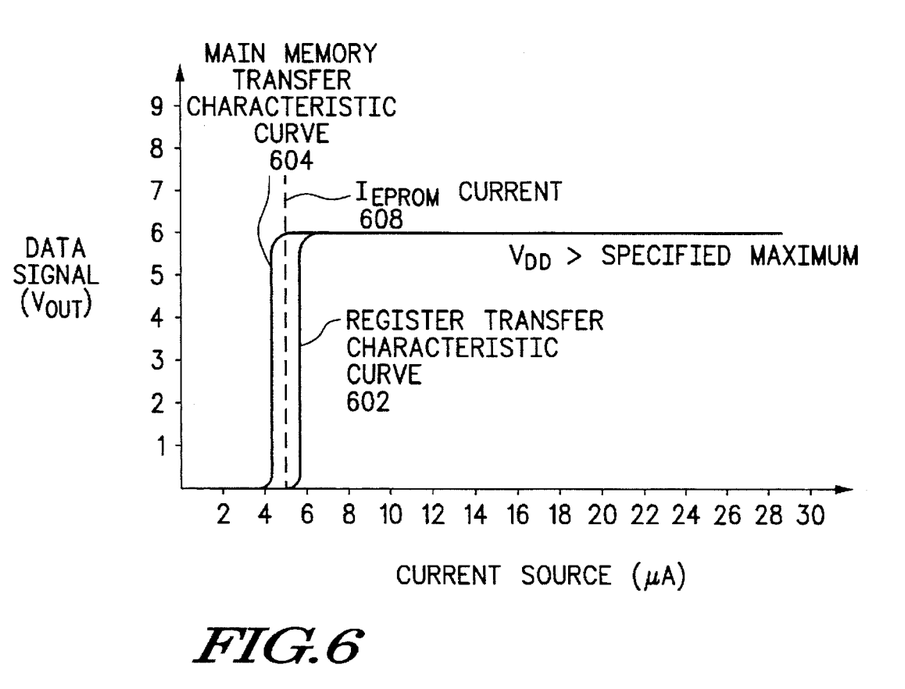
FIG. 6 illustrates, in graphical form, a main memory sense amp characteristic curve and a register characteristic curve.

FIG. 5 demonstrates the effect significantly varying the VDD voltage has on the transfer characteristic curve of a programmed EPROM location. The curve representing the transfer characteristic curve for an EPROM location with a VDD voltage less than the specified minimum voltage shows that the sense amp trip point has shifted. This shift is such that the EPROM will appear to be in a programmed state at a smaller current source bias. The transfer characteristic curve for an EPROM cell location with a VDD voltage greater than the specified minimum voltage shows that the sense amp trip also has shifted. This shift is such that the EPROM will appear to be in an erased state at a greater current source bias. By varying VDD, an EPROM in an erased state can be made to fail such that it appears to be in a programmed state representing a logic level zero. An invalid state or invalid data has occurred when an erased cell appears to be programmed. Conversely, an EPROM in an programmed state, representing a logic level zero, can be made to fail such that it appears to be in an erased state. An invalid state or invalid data has occurred when a programmed cell appears to be erased. The failure is caused by differences in the trip points of the sense amp, differences in the EPROM cells, or a combination of the two. Note that while the trip point transitions shown in FIG. 4, FIG. 5, and FIG. 6, show the low current region to be a logic level low, the actual logic state can be chosen by inverting the sense amp output. The circuits discussed below actually have their outputs inverted, and their actual transfer characteristic curves are inverted as compared to FIG. 4.

The EPROM cells and sense amp that comprise the register, (containing the security bit) are discrete from the EPROM cells and sense amp that comprise the main memory (where the code is stored), consequently small variations in their respective transfer characteristic curves will exist. FIG. 6 illustrates a failure mode based on this difference in transfer characteristic curves. The curves shown represent a programmed register transfer characteristic curve 602, and a programmed main memory transfer characteristic curve 604. The characteristic curves are shown to have slightly different sense amp trip points. Note that the curves are not drawn to scale, and the difference between the curves is generally very small. By raising VDD above the specified maximum range, the two different transfer characteristic curves can be positioned such that one of them is positioned to the right of the current source bias 608, while the other is to the left of the current source bias 608. It is assumed that the two EPROM cells drive the same amount of Ieprom current. In this situation, only one of the two EPROM locations has failed. As a result, if the register location has failed (i.e. the security bit has failed), the microcontroller will incorrectly read the programmed bit to be a logic level low. Because the microcontroller erroneously interprets the security bit, it will not enter security mode. Since the main memory has not failed, as indicated by the main memory transfer characteristic curve 604 of FIG. 6, its data integrity has not been compromised, and a user may now force the microcontroller to operate in an external mode, as discussed above, and copy the program code out of the main memory.

Figure 7:
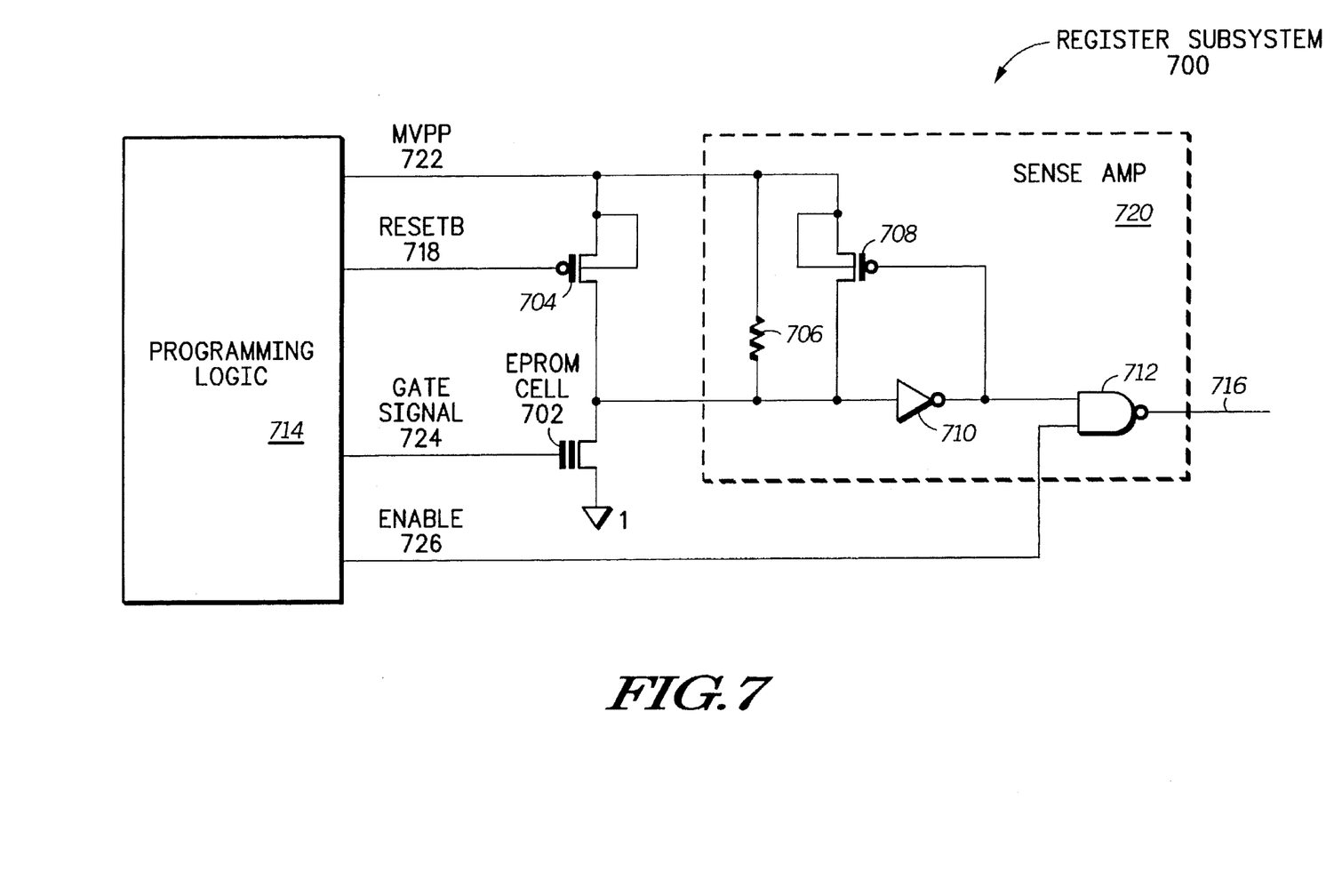
FIG. 7 illustrates, in block and schematic form, a register subsystem in accordance with the invention.
Figure 8:
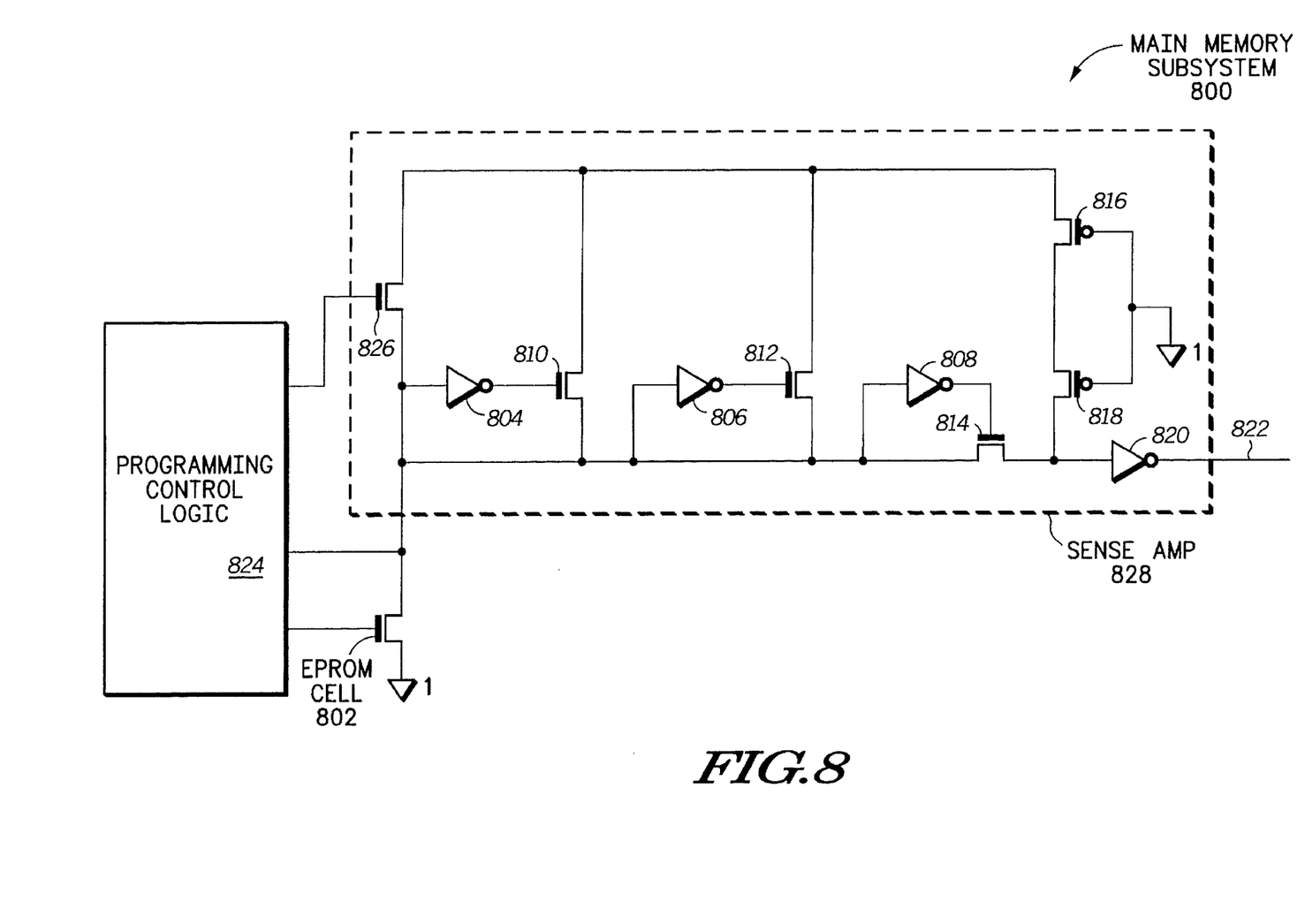
FIG. 8 illustrates, in block and schematic form, a main memory subsystem in accordance with the invention.

FIGS. 7 and 8 illustrate a preferred embodiment of the invention. FIG. 7 illustrates a register subsystem 700 in accordance with a preferred embodiment of the invention which comprises programming logic 714, an EPROM cell 702, a p-channel transistor 704, and a sense amp 720. The sense amp 720 further comprises a high impedance resistor 706 (greater than 100 Megaohms), a p-channel transistor 708 (acting as a weak pull-up device), an inverter 710, and a NAND gate 712. The sense amp 720 is connected to the EPROM register subsystem 700, and the EPROM location is specifically chosen to provide a different sense amp characteristic curve than sense amp 828 (FIG. 8) connected to the main memory subsystem 800. The programming logic 714 provides signals MVPP 722, RESETB 718, GATE 724, and ENABLE 726. Signal MVPP 722 drives the source of the p-channel transistor 704, the source of the p-channel transistor 708, and a first node of the resistor 706. Signal GATE 724 drives the gate of the EPROM cell 702. Signal RESETB 718 drives the gate of transistor 704 and when driven to an active low state causes the register data signal 716 to be driven to a logic high. In the implementation shown, the signal ENABLE 726 is in an active state when high, and is connected to a first input of the NAND gate 712. The source of the EPROM cell 702 is connected to a common reference 1. The drain of the EPROM cell 702 is connected to the drain of the p-channel transistor 704, the second node of the resistor 706, the drain of the p-channel transistor 708, and the input of inverter 710. The output of the inverter 710 is connected to the gate of the p-channel transistor 708, and a second input of the NAND gate 712. The output of the NAND gate 712 provides register data signal 716, and is a logic level representation of the data stored in the EPROM cell 702.

FIG. 8 illustrates a main memory subsystem 800 which comprises programming/control logic 824, a sense amp 828, an EPROM cell 802, a common reference 1, and a supply voltage VDD 2. The sense amp 828 is further comprised of a first n-channel transistor 826, a second n-channel transistor 810, a third n-channel transistor 812, a fourth n-channel transistor 814, a first inverter 804, and second inverter 806, a third inverter 808, a fourth inverter 820, a first p-channel transistor 816, and a second p-channel transistor 818. Note, both the first and second p-channel transistors function as weak pull-up devices.

The programming/control logic 824 is connected to the gate of the first n-channel transistor 826, the drain of the EPROM cell 802, and the gate of the EPROM cell 802. These connections allow for the precharging, and programming of the EPROM cell 802. The source of the EPROM cell 802 is connected to the common reference 1. The drain of the EPROM cell 802 is connected to the source of the first n-channel transistor 826, the input of the first inverter 804, the source of the second n-channel transistor 810, the input of the second inverter 806, the source of the third n-channel transistor/812, the input of the third inverter 808, and the drain of the fourth n-channel transistor 814. The source of the fourth n-channel transistor 814 is connected to the source of the second p-channel transistor 818, and the input of the fourth inverter 820. The drain of the second p-channel transistor 818 is connected to the drain of the first p-channel transistor 816. The gates of the first p-channel transistor 818 and the second p-channel transistor 816 are connected to the common reference 1. VDD is connected the drain of the first n-channel transistor 826, the drain of the second n-channel transistor 810, the drain of the third n-channel transistor 812, and the source of the first p-channel transistor 816. The output of the fourth inverter 820 provides the data signal 822, and is a logic level representation of the data stored in the EPROM cell 802.

In accordance with a preferred embodiment, the sense amp 720 (FIG. 7) and the sense amp 828, of subsystem 800, are designed to provide the register subsystem 700 a sense amplifier characteristic curve which has a trip point at a current source bias different than that of main memory subsystem 800, such that as VDD increases, the main memory fails prior to the register memory. By choosing the values of the resistor 706 and the p-channel transistor 708 the trip point of the characteristic curve of the register subsystem 700 can be affected. Likewise, with the sense amp of the main memory subsystem in FIG. 8, by controlling the values of n-channel transistor 810, and n-channel transistor 812, the trip point of the characteristic curve can be affected. In the preferred embodiment, these sense amp values are chosen such that the register's characteristic curve is to the left, i.e. trips at a lower current level, of the main memory's characteristic curve, such that as VDD increases, the main memory fails prior to the register memory.

An alternative embodiment in accordance with the invention would be to use substantially identical sense amps, and use dissimilar EPROM cells for the register and main memory. A register EPROM cell that is less robust than a main memory EPROM cell would provide less Ieprom current, for a given gate voltage, to the sense amp. As the trip point shifts to the right, requiting more current, the lower current main memory EPROM cell would trip first. Robust refers to the amount of current the EPROM cell would draw from drain to source as compared to another EPROM cell under substantially identical programming, and operating conditions. By varying the physical characteristics, such as transistor sizes, or electrical characteristics, such as transistor doping, how robust the EPROM cell is can be controlled.

Another embodiment of the invention would allow for different programming times for the register EPROM cell and the main memory EPROM cell. For a data processor where a programmed security bit places it in security mode, it would be necessary to allow for a substantially longer programming time for the register EPROM cell than for the main memory EPROM cell. As discussed above with reference to FIG. 3, the longer the programming time applied to an EPROM cell, the further the trip point shifts to the left and trips at a lower current level. By programming registers and main memories using known techniques, but for different times, would provide a main memory characteristic curve which fails before the register's characteristic curve, hence overcoming the prior art problems.

An additional embodiment of the invention would provide different gate bias voltages to the register EPROM cell than to the main memory EPROM cell. For a data processor where a programmed security bit places it in security mode, it would be necessary to provide a gate bias to the register EPROM cell that would cause the register's Ieprom current value to be less than the main memory's Ieprom current. The difference in the programing time would be such to allow the register location to operate after the main memory location has failed.

While the preferred embodiment discussed above dealt with an EPROM memory cell, it is recognized that the invention is also applicable to other types of memory. Including, but not limited to EEPROMs, Flash EEPROMs, and OTPPROMs.

We claim:

1. A security system, in a data processor to limit access to internal storage locations of the data processor, the data processor having a terminal for receiving a specified supply voltage, the security system comprising:

a non-volatile main memory subsystem that is capable of storing main memory data and operating to sense the main memory data in accordance with a first transfer characteristic curve;

a non-volatile register subsystem that is capable of storing register data and operating to sense the register data in accordance with a second transfer characteristic curve; wherein:

the non-volatile register subsystem is capable of limit access to the non-volatile main memory subsystem based on the register data; and the data processor is configured such that the first transfer characteristic curve is different from the second transfer characteristic curve, such that if a voltage on the terminal is varied from the specified supply voltage, the non-volatile register subsystem, which is capable of limiting access to the non-volatile main memory subsystem, provides valid register data longer than the non-volatile main memory subsystem provides valid main memory data.

2. The security system of claim 1, wherein the non-volatile register subsystem comprises:

a first non-volatile memory cell capable of storing the register data and operating in accordance with a first set of characteristic curves;

a first sense amplifier operably coupled to the first non-volatile memory cell, the first sense amplifier capable of operating in accordance with a first sense amp characteristic curve and providing a representation of the register data stored in the first non-volatile memory cell; and wherein, the first sense amplifier operably coupled to the first non-volatile memory cell is capable of operating in accordance to the first transfer characteristic curve.

3. The security system of claim 2, wherein the non-volatile main memory subsystem comprises:

a plurality of non-volatile memory cells which store the data and are capable of operating in accordance with the first set of characteristic curves such that each non-volatile memory cell in the plurality of non-volatile memory cells is substantially similar to the first non-volatile memory cell;

a second sense amplifier operably coupled to at least one non-volatile memory cell of the plurality of non-volatile memory cells, wherein the second sense amplifier is capable of operating in accordance with a second sense amp characteristic curve and providing a representation of the data stored in the at least one non-volatile memory cell; and the second sense amplifier operably coupled to the at least one non-volatile memory cell is capable of operating in accordance to the second transfer characteristic curve.

4. The security system of claim 2, wherein the non-volatile main memory subsystem comprises:

a plurality of non-volatile memory cells which store the data, and capable of operating in accordance with a second set of characteristic curves;

a second sense amplifier operably coupled to at least one non-volatile memory cell of the plurality of non-volatile memory cells, the second sense amplifier capable of operating in accordance with the first sense amp characteristic curve and providing a representation of the data stored in the at least one non-volatile memory cell; and the second sense amplifier operably coupled to the at least one non-volatile memory cell is capable of operating in accordance to the second transfer characteristic curve.

5. The security system of claim 1, wherein the non-volatile register subsystem is capable of providing valid register data while the non-volatile main memory subsystem provides invalid data when a voltage at the terminal is different from the specified supply voltage.

6. A security system, in a data processor to limit access to internal storage locations of the data processor, the data processor having a terminal for receiving a specific voltage, the security system comprising:

a non-volatile register subsystem within the data processor capable of storing register data and operating in accordance with a first transfer characteristic curve, the non-volatile register subsystem comprising:

a first non-volatile memory cell capable of storing the register data and operating in accordance with a first point of a first characteristic curve;

a first sense amplifier operably coupled to the first non-volatile memory cell, the first sense amplifier capable of operating in accordance with a first sense amp characteristic curve and providing a representation of the register data stored in the first non-volatile memory cell;

the first sense amplifier, operably coupled to the first non-volatile memory cell capable of operating in accordance with the first transfer characteristic curve;

a non-volatile main memory subsystem within the data processor that stores data, and capable of operating in accordance with a second transfer characteristic curve, the non-volatile main memory subsystem comprises:

a plurality of non-volatile memory cells capable of storing the data and operating in accordance with a second point of a second characteristic curve;

a second sense amplifier operably coupled to at least one non-volatile memory cell of the plurality of non-volatile memory cells, the second sense amplifier capable of operating in accordance with a second sense amp characteristic curve and providing a representation of the data stored in the at least one non-volatile memory cell;

the second sense amplifier, operably coupled to the at least one non-volatile memory cell, capable of operating in accordance to the second transfer characteristic curve; and wherein:

the first transfer characteristic curve is different than the second transfer characteristic curve such that as a supply voltage is varied from the specified supply voltage the non-volatile register subsystem provides valid data longer than the non-volatile main memory subsystem, thereby assuring that when the non-volatile register subsystem fails that the main memory subsystem has also failed, hence preventing valid main-memory data from being accessed.

7. The security system of claim 6, wherein each non-volatile memory cell in the plurality of non-volatile memory cells is substantially similar to the first non-volatile memory cell, whereby the second characteristic curve is substantially identical to the first characteristic curve.

8. The security system of claim 6, wherein the second sense amplifier is substantially identical to the first sense amplifier.

9. A method for securing a data processor, wherein the data processor has a control bit cell coupled to a control sense amp and a memory bit cell coupled to a memory sense amp, the method comprising the steps of:

provifing a selected current value from the control bit cell to the control sense amp to provide a valid control signal, wherein the control sense amp provides an asserted control signal when the selected current value is in a first control current range, and provides a deasserted control signal when the selected current value is in a second control current range; and providing the selected current value from the memory bit cell to the memory sense amp to provide an invalid memory signal, wherein an input current to the memory sense amp provides a logic low value when the input current is within a first memory current range, and the memory sense amp provides a logic high value when the input current is within a second memory current range, thus assuring the non-volatile register subsystem is capable of providing valid data when the non-volatile main memory subsystem provides invalid data.

10. The method of claim 9, wherein the steps of providing the selected current value further comprises:

providing a selected current value that is a function of a supply voltage used to power the data processor.

11. The method of claim 9, wherein the step of providing a selected current value from the control bit cell to the control sense amp comprises:

providing the valid control signal while providing the invalid memory signal due to the control sense amp from having a different trip current level than the memory sense amp.

12. A method for forming a security circuit in a data processor, the method comprising the steps of:

forming a control storage cell having a first set of characteristic curves;

forming a control sense amplifier coupled to the control storage cell to receive a control current signal from the control storage cell;

forming a memory storage cell having a second set of characteristic curves;

forming a memory sense amplifier coupled to the memory storage cell to receive a data current signal from the memory storage cell, wherein the data current signal has a different value than the control current signal; and wherein the control sense amplifier provides a valid control signal in response to the control current signal while the memory sense amplifier provides invalid data in response to the data current signal when the data processor receives a first supply voltage in a predetermined state, thus assuring the non-volatile register subsystem is capable of providing valid data when the non-volatile main memory subsystem provides invalid data.

13. The method of claim 12, wherein the step of forming a memory storage cell comprises:

forming the memory storage cell different that the control storage cell to cause the data current signal to have the different value than the control current signal.

14. The method of claim 13, wherein the step includes:

forming the memory storage cell with different physical characteristics than the control storage cell.

15. The method of claim 13, wherein the step includes:

forming the memory storage cell with different electrical characteristics than the control storage cell.

16. The method of claim 12, wherein the step of forming a memory storage cell comprises:

forming the memory storage cell with a different voltage bias than the control storage cell to cause the data current signal to have the different value than the control current signal.

17. A method for securing a data processor wherein the data processor has a control bit cell coupled to a control sense amp, and a memory bit cell coupled to a memory sense amp the method comprising the steps of:

programming the control bit cell to a first characteristic curve of a first set of characteristic curves to provide a control current value when the control bit cell is at a predetermined bias level, wherein the control sense amp provides a valid control signal at a first supply voltage, and the control sense amp provides a valid control signal at a second supply voltage; and programming the memory bit cell to a second characteristic curve of a second set of characteristic curves to provide a memory current value when the memory bit cell is at the predetermined bias level, wherein the memory sense amp provides a valid data signal at the first supply voltage, and the memory sense amp provides an invalid data signal at the second supply voltage, wherein the first characteristic curve is different than the second characteristic curve, whereby the control current value is different than the memory current value, thus assuring the non-volatile register subsystem provides valid data when the non-volatile main memory subsystem provides invalid data.

* * * * *